US011265089B2

(12) United States Patent
Cooper

(10) Patent No.: US 11,265,089 B2
(45) Date of Patent: Mar. 1, 2022

(54) REVERSE POWER SHARING

(71) Applicant: British Telecommunications Public Limited Company, London (GB)

(72) Inventor: Ian Cooper, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/733,352

(22) PCT Filed: Dec. 11, 2018

(86) PCT No.: PCT/EP2018/084312
§ 371 (c)(1),
(2) Date: Jul. 8, 2020

(87) PCT Pub. No.: WO2019/137720
PCT Pub. Date: Jul. 18, 2019

(65) Prior Publication Data
US 2020/0350996 A1    Nov. 5, 2020

(30) Foreign Application Priority Data

Jan. 9, 2018  (EP) ..................................... 18150839

(51) Int. Cl.
*H04M 19/00* (2006.01)
*H04B 10/80* (2013.01)
*H04Q 11/00* (2006.01)

(52) U.S. Cl.
CPC .......... *H04B 10/808* (2013.01); *H04M 19/00* (2013.01); *H04Q 11/0067* (2013.01); *H04Q 2213/08* (2013.01)

(58) Field of Classification Search
None
See application file for complete search history.

(56) References Cited

U.S. PATENT DOCUMENTS 9,319,537 B2 *  4/2016  Peker ................... H04L 12/2898
9,413,902 B2 *  8/2016  Cheng ................. H04L 12/6418
(Continued)

FOREIGN PATENT DOCUMENTS

CN       1285680 A     2/2001
CN     104426677 A     3/2015
(Continued)

OTHER PUBLICATIONS

Office Action for Chinese Application No. 201880090279.3, dated Jan. 27, 2021, 19 pages.
(Continued)

*Primary Examiner* — Quoc D Tran
(74) *Attorney, Agent, or Firm* — Patterson Thuente Pedersen, P.A.

(57) ABSTRACT

A power distributor for a communications system for controlling delivery of electrical power drawn over a plurality of electrical communications connections allocated to respective customer premises equipment, to provide electrical power to network components within a network is arranged to control collection of electrical power to be drawn from each connection in accordance with power requirements of services operated by or for its respective customer premises equipment, independent of the identities of the electrical connections used to deliver those services. In particular when electrical connections are not being used by their respective customers they may instead be used by a beamforming system to support improved service to a customer associated with a different connection, and the additional electrical power to power the beam-former is drawn from the connection associated with the customer receiving the enhanced service.

10 Claims, 2 Drawing Sheets

(56) References Cited

U.S. PATENT DOCUMENTS

| | | | |
|---|---|---|---|
| 9,614,976 B2* | 4/2017 | Joffe | H04L 12/2878 |
| 9,621,712 B2* | 4/2017 | Hillaert | H04M 19/08 |
| 9,628,283 B2* | 4/2017 | Cooper | H04M 19/08 |
| 9,893,763 B2* | 2/2018 | Peker | H04B 3/44 |
| 9,992,353 B2* | 6/2018 | Cooper | G05F 1/66 |
| 10,340,977 B2* | 7/2019 | Peker | H04L 12/10 |
| 2008/0159744 A1* | 7/2008 | Soto | H04M 19/08 398/115 |
| 2016/0309045 A1* | 10/2016 | Peker | H04L 12/40045 |
| 2017/0272581 A1* | 9/2017 | Cooper | H04M 19/08 |
| 2018/0131451 A1* | 5/2018 | Marchetti | H04L 49/40 |

FOREIGN PATENT DOCUMENTS

| | | |
|---|---|---|
| CN | 105227212 A | 1/2016 |
| CN | 105493486 A | 4/2016 |
| CN | 107078912 A | 8/2017 |
| EP | 2120443 A1 | 11/2009 |
| WO | WO-2016026688 A1 | 2/2016 |
| WO | WO-2016096583 A3 | 10/2016 |

OTHER PUBLICATIONS

Office Action for Chinese Application No. 201880090279.3, dated Jul. 8, 2021, 8 pages.

Office Action For GB Application No. 1800320.2, dated Nov. 3, 2020, 3 pages.

* cited by examiner

REVERSE POWER SHARING

PRIORITY CLAIM

The present application is a National Phase entry of PCT Application No. PCT/EP2018/084312, filed Dec. 11, 2018, which claims priority from EP Patent Application No. 18150839.1, filed Jan. 9, 2018, each of which is hereby fully incorporated herein by reference.

TECHNICAL FIELD

This disclosure relates to provision of electrical power to a communications system, and in particular a reverse-power system, that is to say a system for supplying electrical power from customer premises to nodes in a communication network.

BACKGROUND

Traditional telephone networks, including customer premises equipment (CPE), were powered from the network end (the exchange), the power being carried by the same conducting wires that carried the actual electrical signals used in telephony. This allowed telephone connections to be supplied to premises which did not have their own electricity supply. The ability to maintain at least a basic telephony service in the event of a failure of the local power supply still has advantages, not least in providing the facility to report the power failure.

However, recent developments have made exchange-end powering both less practical and less essential. The traditional "copper" conducting-wire network is increasingly being replaced by higher-capacity optical or microwave connections, which are of course not suitable for supplying electrical power, and indeed need a power supply at each end of the connection, and at any relay or amplification points. In some cases the legacy copper network is still maintained alongside the newer connections expressly for this purpose, but this is not always convenient, practical or economic.

In many systems the "final drop" into the customer premises remains as an electrical "twisted pair" connection. Such systems are known as "Fiber to the Kerb" or "Fiber to the Distribution Point". Where this is the case, it can be convenient to "reverse power" network equipment, and specifically the fiber/copper interface, by drawing power from the customer premises' supply and feeding it into the network over the electrical conductor. In most cases, the network equipment to be powered in this way serves a number of customer premises. As part of the set of basic requirements for reverse-powered remote small nodes on a xDSL (digital subscriber line) system, there is a requirement to be able to power such a remote node in a manner that does not unnecessarily overburden one or more user, so a power sharing algorithm is implemented that distributes the powering burden fairly over the total number of active users.

Algorithms have been already developed to ensure that users provide electrical power to the node from their individual CPE devices over their individual twisted-pair drop cable and that this power is delivered both fairly and efficiently. In general, and subject to a power supply being available at the customer premises, "fair" power sharing algorithms divide the power taken from each individual CPE such that each CPE delivers an average value of the total power required i.e. with six users connected to a data processing unit (DPU) and with a remote total power requirement of 18 W then each user launches sufficient power to sink 3 W at the DPU. Alternatively the 'fair' power algorithm could be configured to sink a power proportional to the maximum bitrate attainable by each user or may be varied dynamically in proportion to the use being made of the network over each connection, so that a connection hosting a high-bandwidth session over xDSL will deliver more power than a connection currently being used only for a telephone call.

Provision is usually made in such systems to maintain at least a very low bandwidth service even if the user is unable to contribute any power to the system, for example because of a mains power failure at home and with no battery-backup being available—this "lifeline" facility allows basic phone calls to be made, for example to the power utility to report the outage, or to the emergency services.

However, existing reverse-power allocation systems operate on the assumption that each individual twisted pair line can be unambiguously and uniquely associated with the origin of the session or call traffic it is carrying. However, new DSL beamforming techniques such as vectoring and beamforming are being developed, in which unused twisted pair lines (i.e. lines that would otherwise be inactive) may be used to increase the overall bit-rate of a specific circuit. Consequently there is no longer a direct and permanent association between a twisted-pair connection and a specific customer premises equipment.

From an individual perspective, reverse powering includes the individual remote modem located with the DPU (known as the xTU-O), plus a share of all the overhead electronics that provides the optical backhaul, any Ethernet switching capability, a network management processor etc. As users get added to a functional DPU, the burden of powering the overhead electronics becomes less for each user.

In a vectored system, the vector group forms a crosstalk-cancelling system that attempts to increase the bit-rate of all members of the vector group. The G.fast standard requires all active users, (but only the active users) to be members of a vectoring group. Hence the powering of all lines of the vector group is necessary and occurs by default by use of existing fair-powering algorithms. Unlike the other overheads, the powering of the vector engine becomes proportionally higher with an increasing number of users. A single user will not require any vectoring to be performed, but as more users become active then their individual power contributions can be 'fairly' shared which is sufficient to power the vectoring engine that is required for multiple users (in a G.fast case where vectoring is mandatory).

New techniques such as "beamforming" are being developed which make use of unused twisted pair lines (not currently in use by their nominal users) by adding them to the vector group in order to increase the downstream performance for one (or more) targeted line. Beam forming can be considered to be an advanced form of vectoring where additional gain can be obtained in a particular DSL channel from the use of lines outside of the vector group. For example—if a ten-pair cable is connected to a DPU and five lines are active, then a simple vector group will consist of those five active lines, and the other five lines are normally inactive. Beamforming provides a higher downstream capability (by increasing the number of bits/tone) in the active lines by modifying the vector group, which it achieves by employing the inactive lines to expand the vector group.

The term "Beamforming" is derived by analogy with the wireless context, as it increases the rate of a DSL channel by using extra transmitters (wires) that transmit a signal in such a way that the receiver gains benefit from modified crosstalk signals that coherently modify the resultant signal at the receiving end, in the same way that in a wireless context phase-shifted streams are dynamically transmitted from multiple radios in such a way that the signals transmitted experience constructive phase summation and build up coherently as a beam focused on the destination of the signal. In the DSL context, signals are injected on the unused pairs that modify and enhance the vectored performance for the targeted line in order to increase the downstream rate. The technique allows a higher downstream capability to be provided in one or more active lines, by increasing the overall bit-rate of a specific circuit, to allow higher bitrates to be offered to individual customers who are prepared to pay for this service. The technique may also be used to improve the performance of a line that is operating below par.

Developments in 'beam-forming' algorithms for xDSL have made power-sharing a more complex issue. The extra lines used for beamforming require powering, and it is desirable that the source of this power is not the nominal customer associated with the line, who is not using it, but the targeted user benefitting from the beamforming process.

SUMMARY

According to a first aspect of the disclosure there is provided a power distributor for a communications system for controlling delivery of electrical power drawn over a plurality of electrical communications connections allocated to respective customer premises equipment, to electrically powered network components within a network, the power distribution having one or more control inputs to receive inputs relating to the electrical power required by one or more network interface functions, and to the identities of customer premises equipment connections currently served by the network interface functions, and a plurality of control outputs, arranged to control collection of electrical power to be drawn from each connection in accordance with power requirements of services operated by or for its respective customer premises equipment, the power to be drawn from each customer premises equipment being controlled in accordance with the power requirements of the services delivered to the respective customers, independent of the identities of the electrical connections used to deliver those services, the power distributor having a first input from a first interface unit controlling communications over a plurality of connections on which power requirements are apportioned equally between a plurality of electrical connections, and a second input from a second interface unit controlling communications over a subset of the plurality of electrical connections and on which power requirements are apportioned to one or more active members of the subset.

In a second aspect, the disclosure provides a method of delivering electrical power to one or more elements of a communications system in which power is drawn over a plurality of electrical communications connections allocated to respective customer premises, wherein a power sharing process is used to control the power drawn from each connection in accordance with power requirements of services operated by or for its respective customer premises equipment, wherein one or more electrical connections allocated to a first set of customer premises are used, when not required by the first set of customer premises, to augment communications capacity delivered to a second set of customer premises, and the power to be drawn from each electrical connection is controlled in accordance with the power requirements of the services delivered to the respective customers, independent of the identities of the electrical connections used to deliver those services, wherein a first interface unit controls communications over a plurality of connections on which power requirements are apportioned equally between a plurality of electrical connections, and a second interface unit controls communications over a subset of the plurality of electrical connections and on which power requirements are apportioned to one or more active members of the subset.

The power distributor may be arranged such that power is not taken from members of the subset other than the active member or members.

In the embodiments to be described, the first interface unit is a vectoring unit for co-ordinating communications on a plurality of communications links sharing a common physical carrier, and the second interface unit is a beamforming unit for converting between a signal on a single connection and a co-ordinated series of signals on parallel connections. In the embodiments the common communications carrier is a cable comprising a plurality of twisted pairs making up the individual connections.

Embodiments of the disclosure modify the 'fair' sharing idea for reverse-powering amongst multiple users (whether this is equal power, or constant voltage or current based) in order to provide the extra power required to allow inactive lines to be used to perform beamforming to increase the downstream data capacity on active lines.

Consequently, for beamformed lines, any user that is actively using beamforming provides the total additional power required to provide that beamforming. For example, using the example previously discussed in which six users would require a total of 18 W without beamforming, if one user uses beamforming, requiring an additional 10 W to power the additional xTU-O modems and the extra remote signal processing, then five users would sink 3 W at the DPU as before but the beamformed line would sink 13 W at the DPU.

The remote node located at the DPU normally performs the fair power sharing algorithm, dividing the power it receives from the active users that are reverse powering that device. The DPU is adapted to modify the algorithm to be able to power additional modems (not being currently used by the 'normal' users attached to them). The beamforming modifies the vectoring group beyond that normally required to achieve 'standard' vectoring operation.

BRIEF DESCRIPTION OF THE DRAWINGS

An embodiment of the disclosure, by way of example, will now be described with reference to the drawings, in which.

DETAILED DESCRIPTION OF EMBODIMENTS

Figure 1:
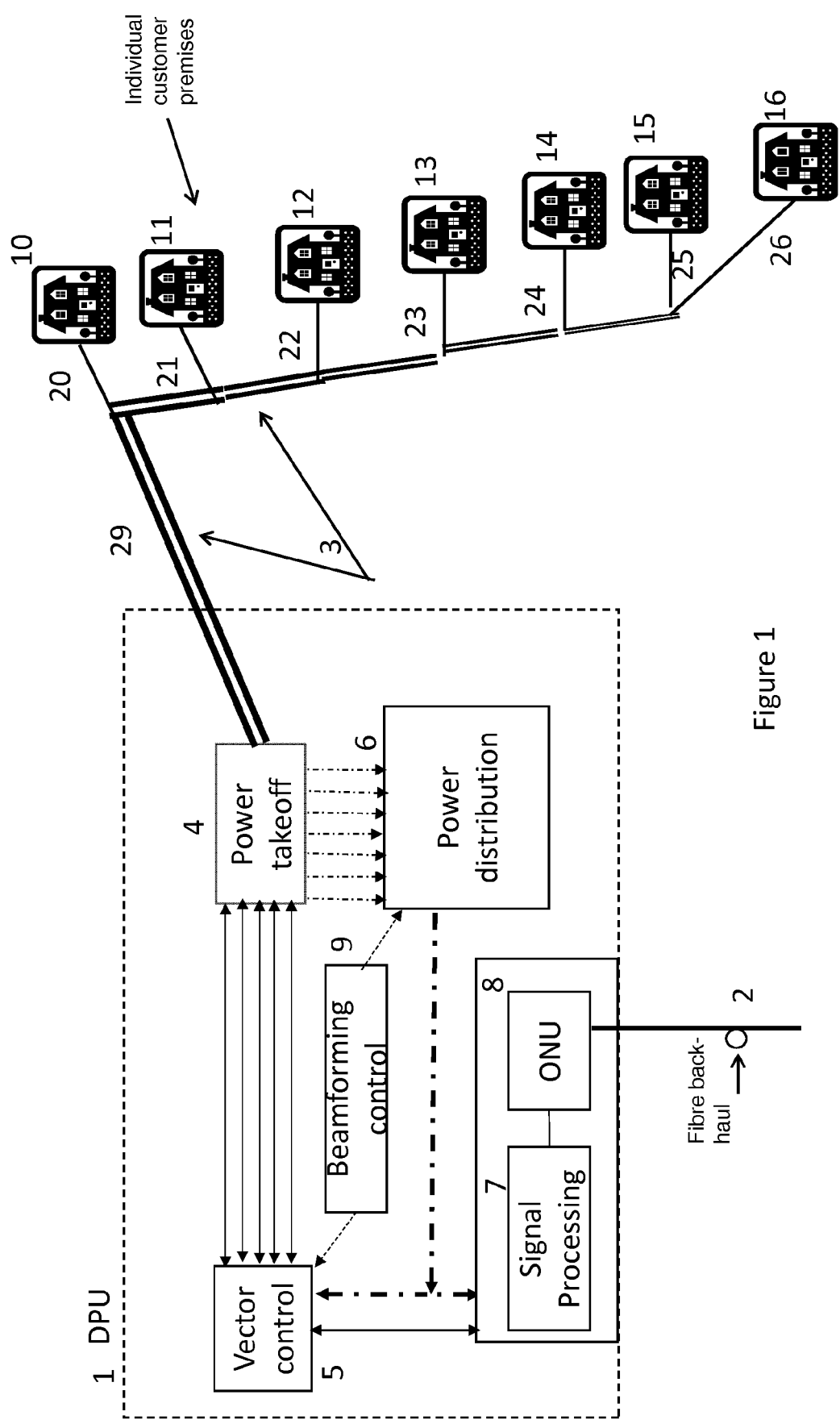
FIG. 1 is a schematic representation of a simplified local distribution network.

FIG. 1 depicts a typical copper drop scenario configured with what is known as a "frontage-T". A fiber/copper interface data processing unit (DPU) 1 provides the termination of a fiber backhaul link 2. A multiple-pair cable 3 starts out with many pairs at the DPU and as it passes each premises (10, 11, 12, 13, 14, 15, 16), a single pair (respectively 20, 21, 22, 23, 24, 25, 26), gets separated, and terminated at the premises. Crosstalk increases with distance, but the rate of increase declines as the number of pairs in the cable reduces as individual customer drops branch away. Thus the rate of increase of crosstalk is greatest in the segment 29 with the largest number pairs.

Vectoring is performed by a vectoring unit 5, as described in ITU standard ITU-T G.993.5. The DPU has a power sharing function 6 which normally performs a fair power sharing algorithm by fairly dividing the power it receives from the active users that are reverse powering the unit. In this embodiment, a beamforming function 9 is provided and the power sharing function 6 is modified to be able to power additional modems (not currently used by the 'normal' user that is attached to them). The beamforming modifies the vectoring group beyond that normally required to achieve 'standard' vectoring operation. Beamforming can be considered to be an advanced form of vectoring where additional gain can be obtained in a particular DSL channel from the use of lines outside of the vector group. For example—if a ten-pair cable is connected to a DPU and five lines are active then the vector group will consist of those five active lines and the other five lines are inactive.

Beamforming provides a higher capability in the active lines by increasing the number of bits/tone by expanding the vector group to employ the otherwise inactive lines. Consequently, these inactive lines also need to be powered.

Figure 2:
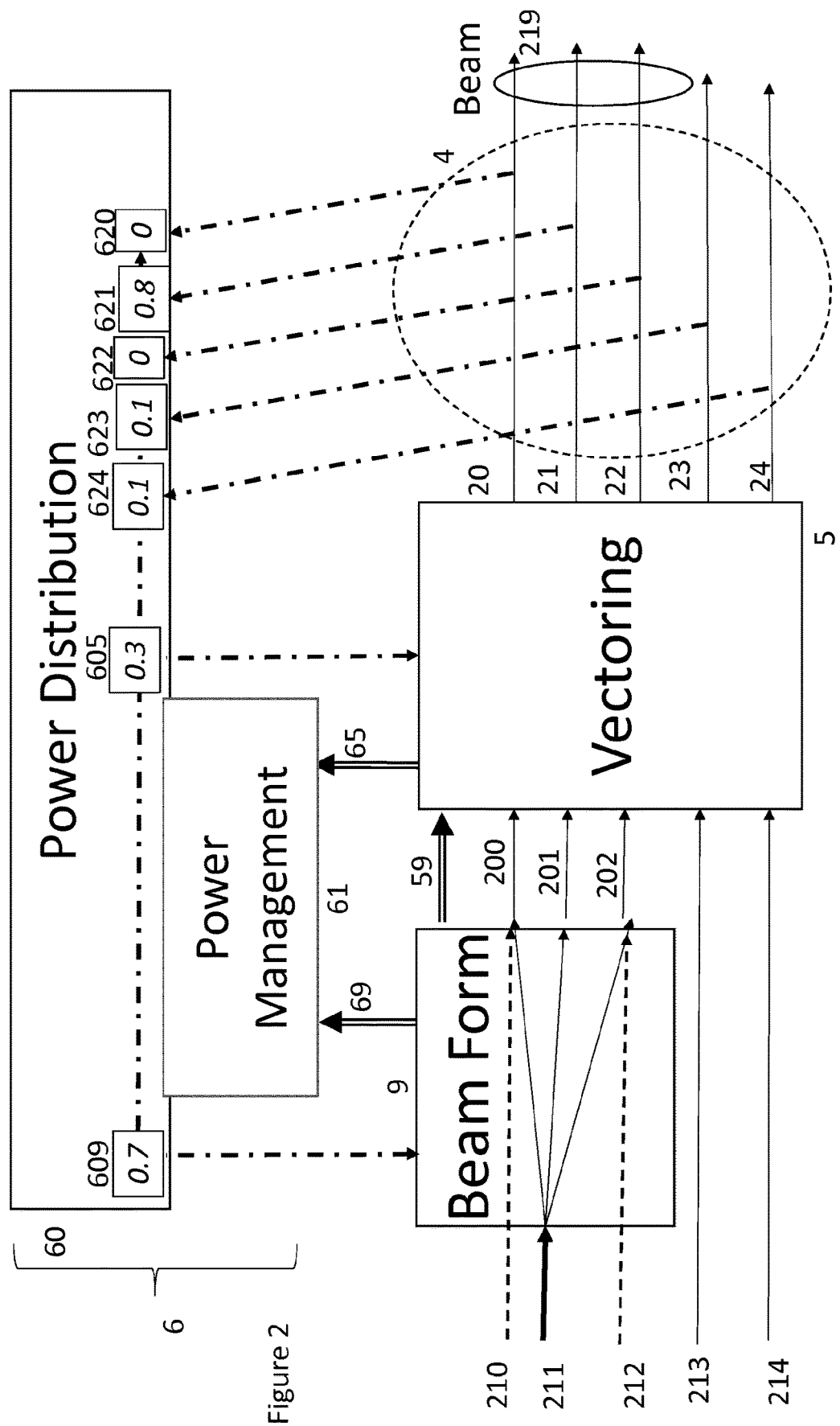
FIG. 2 is a more detailed schematic representation of the operation of the functional elements of the distribution unit depicted in FIG. 1.

In this embodiment, the extra power to do this is drawn from the line making use of the beamforming capability. This is shown diagrammatically in FIG. 2.

Chain dotted lines indicate power feeds, solid lines indicate lines carrying data, dashed lines indicate lines not currently in use, and doubled lines indicate control functions.

Five "final drop" lines are shown, of which two lines 23, 24 are using a standard data service, two lines 20, 22 are not in use by their end-users, and one line 21 is making use of an enhanced service using beam forming, making use of the spare capacity represented by the lines 20, 22.

The beam forming function 9 distributes the data feed 211 to the user 11 over three lines 20, 21, 22, making use of the spare capacity available from the unused lines 20, 22, as well as the dedicated line 21. The outputs 200, 201, 202 from the beamforming function are processed by the vectoring function 5, along with the standard lines 23, 24, to form respective outputs 20, 21, 22, 23, 24 (of which three outputs 20, 21, 22 make up the beamformed output 219, and are processed by the vectoring function according to instructions 59 from the beamforming function) to be fed to the signal processing unit for transmission over the cable 29.

For this example, it is assumed that the beam forming function 9 requires 0.7 units of power, and the vectoring function 5 requires 0.3 units. These power requirements are communicated to the power management system 61 by respective control functions 69, 65, along with the identities of the lines which are making use of each function. The power management system 61 controls the power distribution network 60 to control the various power connections 620, 621, 622, 623, 624 to draw power from the respective lines 20, 21, 22, 23, 24 in proportions according to the functions being used by each end-user. In this example, the vectoring unit 5 uses 0.3 units, and thus 0.1 unit is drawn from each of the three users 21, 23, 24 using the data service. The beam forming function 9 uses an additional 0.7 units, and this is drawn only from the line 21 making use of the function, making a total of 0.8 units from that line. No power is drawn from lines 20, 22 that are not in use. The power is then delivered to the vectoring and beam forming units (5, 9) under the control of respective power outlet controls 605, 609. If the beamforming were not taken into account, all lines associated with providing input to the vectoring function would have the same amount of power drawn from them to power the vectoring function, including the lines 20, 22 whose users 10, 12 are not currently making use of the data service.

Two algorithms are currently being investigated for beamforming, namely the Tomlison Harashima Precoder (THP) and the Maximal Ratio Transfer algorithm (MRT). In use the THP algorithm has been found to be optimum when a majority of lines are in use (say eight or more lines in a ten-pair cable), the MRT algorithm is optimum for a mid-range of lines (say between four and seven lines) and a combination of both THP+MRT is optimum for small numbers of lines (up to three lines). However, the MRT algorithm requires lower powers on the inactive lines, and would therefore have less impact on the extra power required to be taken from the active reverse-powered lines.

The invention claimed is:

1. A power distributor for a communications system for controlling delivery of electrical power drawn over a plurality of electrical communications connections allocated to respective customer premises equipment, to electrically powered network components within a network, the power distributor comprising:
   one or more control inputs to receive inputs relating to electrical power required by one or more network interface functions, and to identities of customer premises equipment connections currently served by the one or more network interface functions; and
   a plurality of control outputs arranged to control collection of electrical power to be drawn from each customer premises equipment connection in accordance with power requirements of services operated by or for respective customer premises equipment, the electrical power to be drawn from each customer premises equipment being controlled in accordance with the power requirements of the services delivered to respective customers, independent of identities of electrical connections used to deliver the services,
   wherein the power distributor has a first input from a first interface unit controlling communications over a plurality of connections on which power requirements are apportioned equally between a plurality of electrical connections, and a second input from a second interface unit controlling communications over a subset of the plurality of electrical connections and on which power requirements are apportioned to one or more active members of the subset of the plurality of electrical connections.

2. The power distributor according to claim 1, arranged such that power is not taken from members of the subset of the plurality of electrical connections other than the one or more active members.

3. The power distributor according to claim 1, wherein the first interface unit is a vectoring unit for co-ordinating communications on a plurality of communications links sharing a common physical carrier.

4. The power distributor according to claim 3, wherein the common physical carrier is a cable comprising a plurality of twisted pairs making up the individual connections.

5. The power distributor according to claim 3, wherein the second interface unit is a beamforming unit for converting between a signal on a single connection and a co-ordinated series of signals on parallel connections.

6. A method of delivering electrical power to one or more elements of a communications system in which power is drawn over a plurality of electrical communications connections allocated to respective customer premises, wherein a power sharing process is used to control the power drawn from each of the plurality of electrical communications connections in accordance with power requirements of services operated by or for respective customer premises equipment, the method comprising:

using one or more electrical connections allocated to a first set of customer premises are used, when not required by the first set of customer premises, to augment communications capacity delivered to a second set of customer premises; and controlling the power to be drawn from each electrical communications connection in accordance with the power requirements of the services delivered to the respective customers, independent of identities of the electrical communications connections used to deliver the services, wherein a first interface unit controls communications over a plurality of connections on which power requirements are apportioned equally between a plurality of electrical connections, and a second interface unit controls communications over a subset of the plurality of electrical connections and on which power requirements are apportioned to one or more active members of the subset of the plurality of electrical connections.

7. The method according to claim 6, wherein electrical power is not taken from members of the subset of the plurality of electrical connections other than the one or more active members.

8. The method according to claim 6, wherein the first interface unit is a vectoring unit for co-ordinating communications on a plurality of communications links sharing a common carrier.

9. The method according to claim 8, wherein the common communications carrier is a cable comprising a plurality of twisted pairs making up the individual connections.

10. The method according to claim 9, wherein the second interface unit is a beamforming unit for converting between a signal on a single connection and a co-ordinated series of signals on parallel connections.

* * * * *